United States Patent [19]
Phillips

[11] Patent Number: 4,492,353
[45] Date of Patent: Jan. 8, 1985

[54] AIRCRAFT CAPABLE OF VERTICAL SHORT TAKEOFF AND LANDING

[76] Inventor: Bryan D. Phillips, 11605 49th Avenue North, Plymouth, Minn. 55442

[21] Appl. No.: 430,432

[22] Filed: Sep. 30, 1982

[51] Int. Cl.³ .................. B64C 15/12; B64C 29/00
[52] U.S. Cl. .................................. 244/12.4; 244/55; 244/56
[58] Field of Search .............. 244/12.4, 7 C, 56, 66, 244/55; 308/211, 214

[56] References Cited

U.S. PATENT DOCUMENTS

| | | | |
|---|---|---|---|
| 1,590,859 | 6/1926 | Scribner | 308/211 |
| 2,780,424 | 2/1957 | Price | 244/12.4 |
| 2,855,251 | 10/1958 | McNicoll | 308/214 |
| 2,926,869 | 3/1960 | Sullivan | 244/56 |
| 2,961,189 | 11/1960 | Doak | 244/56 |
| 3,031,157 | 4/1962 | Varden . | |
| 3,057,173 | 10/1962 | Varden . | |
| 3,081,964 | 3/1963 | Quenzler | 244/56 |
| 3,089,668 | 5/1963 | Goodall . | |
| 3,096,952 | 7/1963 | Roppel . | |
| 3,165,280 | 1/1965 | Lee | 244/56 |
| 3,284,027 | 11/1966 | Mesniere . | |
| 3,311,327 | 3/1967 | Greulich . | |
| 3,385,066 | 5/1968 | Mullins . | |
| 3,469,803 | 9/1969 | Schmielau | 244/12.4 |
| 3,606,210 | 9/1971 | Busby . | |
| 3,614,034 | 10/1971 | Townsend . | |
| 3,806,214 | 4/1974 | Keiser | 308/211 |

OTHER PUBLICATIONS

Jones, Lloyd S., "U.S. Fighters," (Aero Publishers, Inc. 1975), pp. 293–295, Fallbrook, CA.
Mondey, David (Editor), "The International Encyclopedia of Aviation," (Crown Publishers, Inc.), pp. 358–363, New York, NY.
Kocivar, Ben, "Tilt-Engine V/STOL," Popular Science (Times Mirror Magazines, Inc. 1981), pp. 72–74, 138, New York.

*Primary Examiner*—Galen L. Barefoot
*Attorney, Agent, or Firm*—Wicks & Nemer

[57] ABSTRACT

An aircraft capable of vertical short takeoff and landing is shown according to the teachings of the present invention as including four separate engine locations. In its most preferred form, the first and second engines are located on opposite sides of the fuselage of the aircraft and are pivotal about first and second axes which are in a plane perpendicular to the longitudinal axis of the aircraft and which are in front of the center of gravity of the aircraft. The third and fourth engines are located on opposite sides of the fuselage of the aircraft and are pivotal about third and fourth pivot axes which are parallel to the first and second axes of the first and second engines, respectively, but which are behind the center of gravity of the aircraft. The engines are mounted and rotated about their respective pivot axes by a system including a shaft having a first end operatively attached to the engine. The shaft is pivotally mounted to the fuselage of the aircraft by a bearing system including first and second tapered roller bearing members wedged between frusto-conical surfaces formed in a bearing mount, on the shaft, and on a collar removably attached to the shaft. A drive gear is attached to the shaft for rotation by a worm gear driven in turn by actuators such as hydraulic or electric motors. Thus, the engines at all four locations can be simultaneously pivoted about their respective axes.

7 Claims, 8 Drawing Figures

AIRCRAFT CAPABLE OF VERTICAL SHORT TAKEOFF AND LANDING

BACKGROUND

The present invention relates generally to aircraft and specifically to aircraft capable of vertical and/or horizontal flight, and particularly to aircraft capable of vertical short takeoff and landing.

Prior to the present invention, aircraft capable of vertical and/or horizontal flight were of a very complicated design, placed unbalanced thrust on the aircraft fuselage, were relatively unstable, included complicated engine mounting and rotating systems, and the like. Thus, such aircraft were expensive to manufacture and maintain, were very complicated to fly, posed safety problems, and were otherwise disadvantageous. Thus, a need has arisen for an aircraft capable of vertical short takeoff and landing which is of a less complicated design, places a balanced thrust on the aircraft fuselage, and utilizes a less complicated engine mounting and rotating system.

SUMMARY

The present invention solves this and other needs by providing an aircraft including first, second, third, and fourth engine means. The first and second engine means are pivotally mounted on opposite sides of the fuselage about first and second pivot axes which are in a plane which is perpendicular to the longitudinal axis of the aircraft and which are in front of the center of gravity of the aircraft. The third and fourth engine means are pivotally mounted on opposite sides of the fuselage of the aircraft about third and fourth pivot axes which are in a plane which is perpendicular to the longitudinal axis of the aircraft and which are behind the center of gravity of the aircraft, with the spacing of the first axis from the center of gravity being generally equal to the spacing of the second axis from the center of gravity.

In its most preferred form, the engine means are mounted and rotated by a shaft having its first end attached to the engine means. In the preferred embodiment, the shaft is held by a bearing means allowing rotation of the shaft but preventing the shaft from moving in any other direction. Further, members for rotating the shaft are provided according to the teachings of the present invention.

Thus, it is an object of the present invention to provide a novel aircraft which is capable of vertical short takeoff and landing.

It is further an object of the present invention to provide such an aircraft utilizing engines that pivot allowing engine thrust to be utilized in the desired direction.

It is further an object of the present invention to provide such an aircraft including four separate engine locations having a relationship to the center of gravity of the aircraft to insure a balanced thrust is placed upon the aircraft.

It is further an object of the present invention to provide such an aircraft where the engines are located on the aircraft so as not to interfere with engine performance or cause the engines to interfere with each other's performance throughout the full pivot arc of the engines.

It is further an object of the present invention to provide such an aircraft where the engines are pivotally mounted to the fuselage and not to the wings or other movable or complicated structures attached to the fuselage.

It is further an object of the present invention to provide such an aircraft which is of a simplified design, maximizes material, and is easier to fly.

It is further an object of the present invention to provide such an aircraft which is of a stable design.

It is further an object of the present invention to provide such an aircraft which obtains a dihedral-like effect.

It is further an object of the present invention to provide such an aircraft which obtains a dihedral-like effect by rotating the engines about a single pivot axis.

It is further an object of the present invention to provide a novel engine mounting and rotating system.

These and further objects and advantages of the present invention will become clearer in light of the following detailed description of an illustrative embodiment of this invention described in connection with the drawings.

DESCRIPTION OF THE DRAWINGS

The illustrative embodiment may best be described by reference to the accompanying drawings where.

Figure 1:
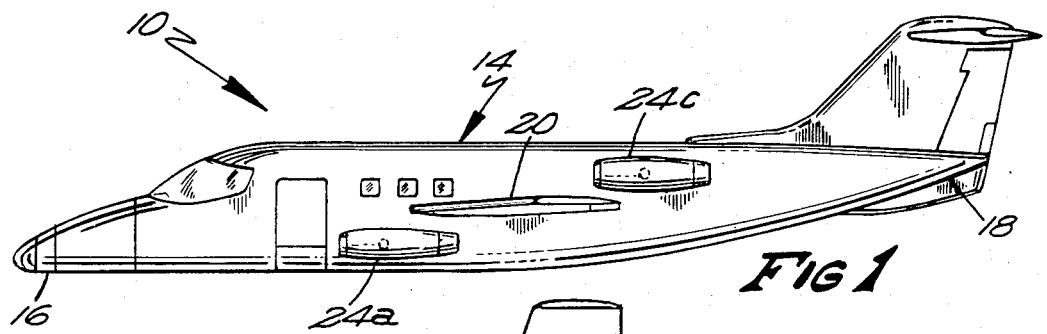
FIG. 1 shows a side view of an aircraft according to the teachings of the present invention.
Figure 2:
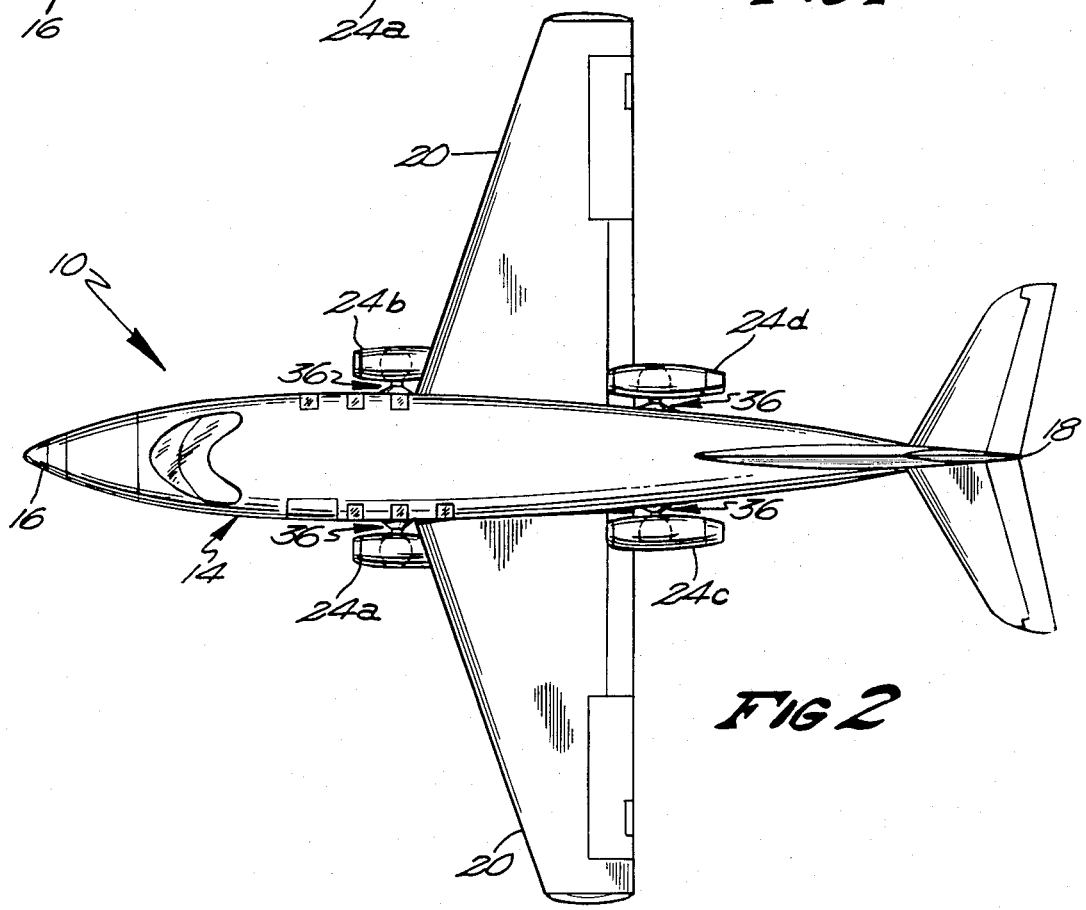
FIG. 2 shows a top view of the aircraft of FIG. 1.
Figure 5:
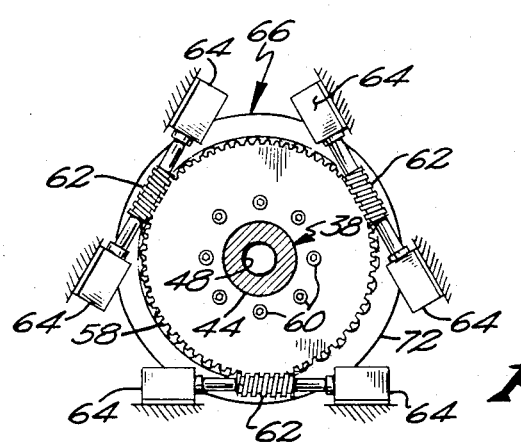
FIG. 5 shows a cross-sectional view of the aircraft of FIG. 1 according to section line 5—5 of FIG. 4.
Figure 3:
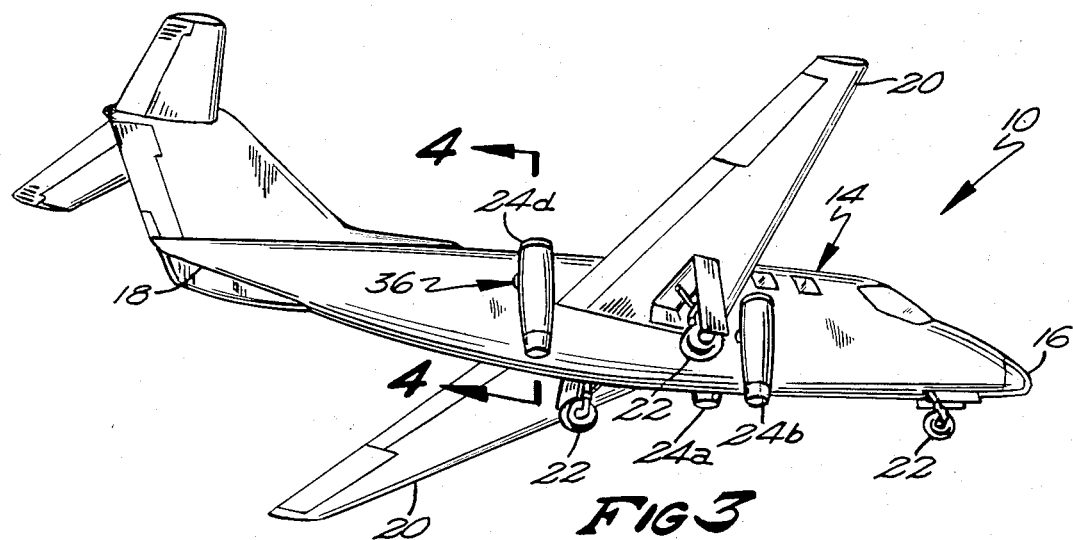
FIG. 3 shows a perspective view of the aircraft of FIG. 1.
Figure 4:
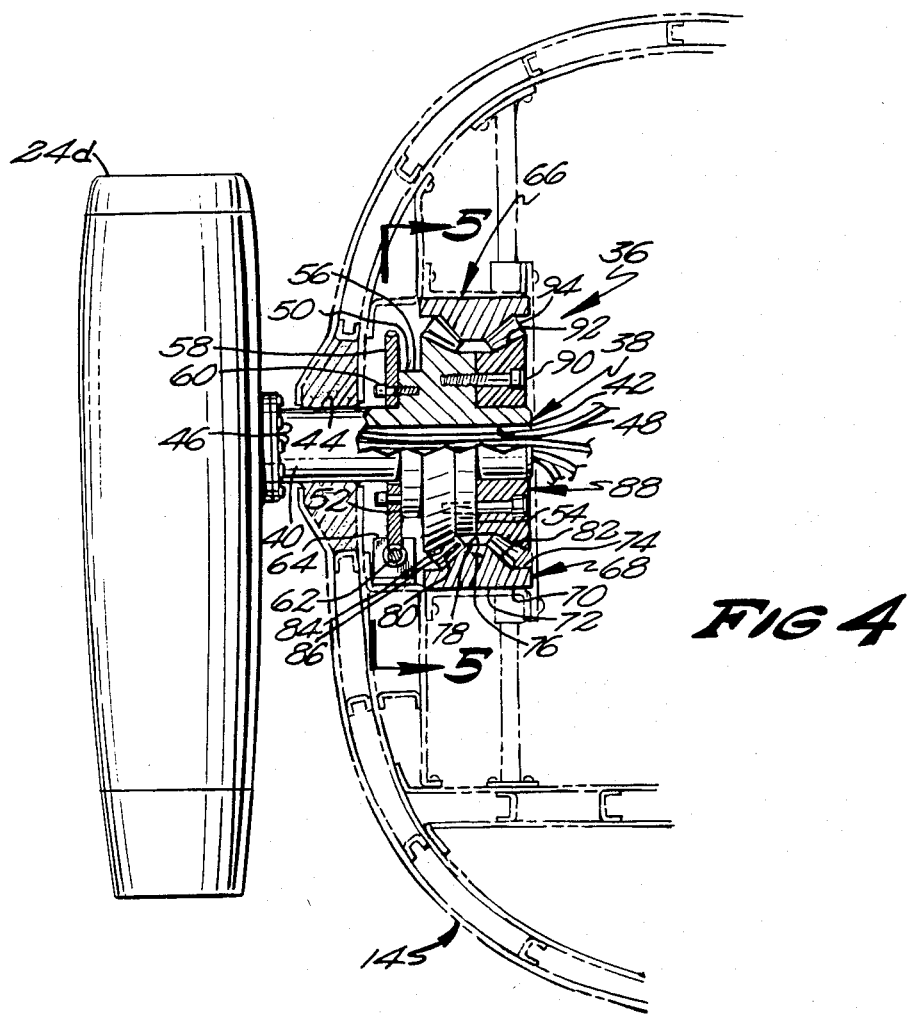
FIG. 4 shows a partial cross-sectional view of the aircraft of FIG. 1 according to section line 4—4 of FIG. 3.

All figures are drawn for ease of explanation of the basic teachings of the present invention only; the extension of the figures with respect to number, position, relationship, and dimensions of the parts to form the preferred embodiment will be explained.

Where used in the various figures of the drawings, the same numerals designate the same or similar parts. Furthermore, when the terms "first", "second", "horizontal", "longitudinal", and similar terms are used herein, it should be understood that these terms have reference only to the structure shown in the drawings as it would appear to a person viewing the drawings and are utilized only to facilitate describing the invention.

DESCRIPTION

An aircraft according to the teachings of the present invention is generally shown in the figures and designated 10. Aircraft 10 generally includes a fuselage 14 including a front 16 and tail 18, wings 20 located on opposite sides of fuselage 14 generally perpendicular to the longitudinal axis of aircraft 10, and suitable landing gear 22. In its preferred form, wings 20 are mid-mounted to fuselage 14 or in other words are located generally midway of the vertical height of fuselage 14.

Aircraft 10 according to the teachings of the present invention is capable of vertical and/or horizontal flight known in the art as Vertical/Short Takeoff and Landing (V/STOL) aircraft by pivoting turbine engines 24 allowing engine thrust to be utilized in the desired direction. Specifically, according to the teachings of the present invention, four engine locations 24a-d are utilized.

Particularly in the preferred embodiment of the present invention, the first and second engines 24a and 24b are located on opposite sides of fuselage 14 generally equidistant from the longitudinal axis of aircraft 10 and are pivotal about first and second pivot axes, respectively, which are in a plane generally perpendicular to the longitudinal axis of aircraft 10 and which are in front of the center of gravity of aircraft 10, and in the preferred form is below and in front of wings 20.

In a similar manner, the third and fourth engines 24c and 24d are located on opposite sides of fuselage 14 generally equidistant from the longitudinal axis of aircraft 10 and are pivotal about third and fourth pivot axes, respectively, which are in a plane generally perpendicular to the longitudinal axis of aircraft 10 and which are behind the center of gravity of aircraft 10, and in the preferred form is above and behind wings 20.

In the preferred embodiment, the pivot axes of the third and fourth engines 24c and 24d are parallel to the pivot axes of the first and second engines 24a and 24b, respectively, and are generally located diagonally from each other from wings 20. The pivot axes of first and second engines 24a and 24b are in front of the center of gravity generally the same distance the pivot axes of the third and fourth engines 24c and 24d are behind the center of gravity in the most preferred form of the present invention. It should then be appreciated that the center of gravity is not constant in aircraft 10 but varies with the mass of the payload, fuel, passengers, and the like. Thus, the pivot axes of engines 24 are based on an approximation of the center of gravity. In its most preferred form of the present invention, the pivot axes of engines 24 are all located above the center of gravity of aircraft 10.

Figure 6:
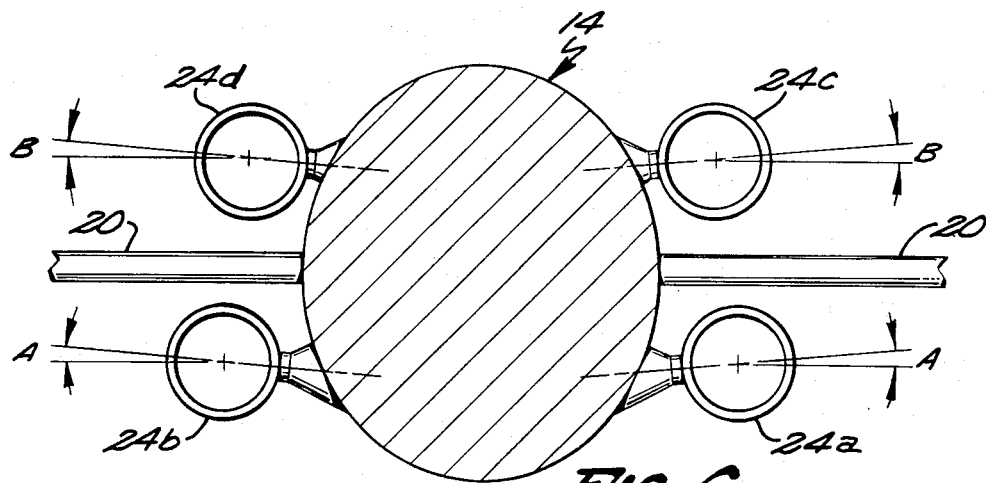
FIG. 6 shows a diagramatic, end view of the aircraft of FIG. 1 in horizontal flight.
Figure 7:
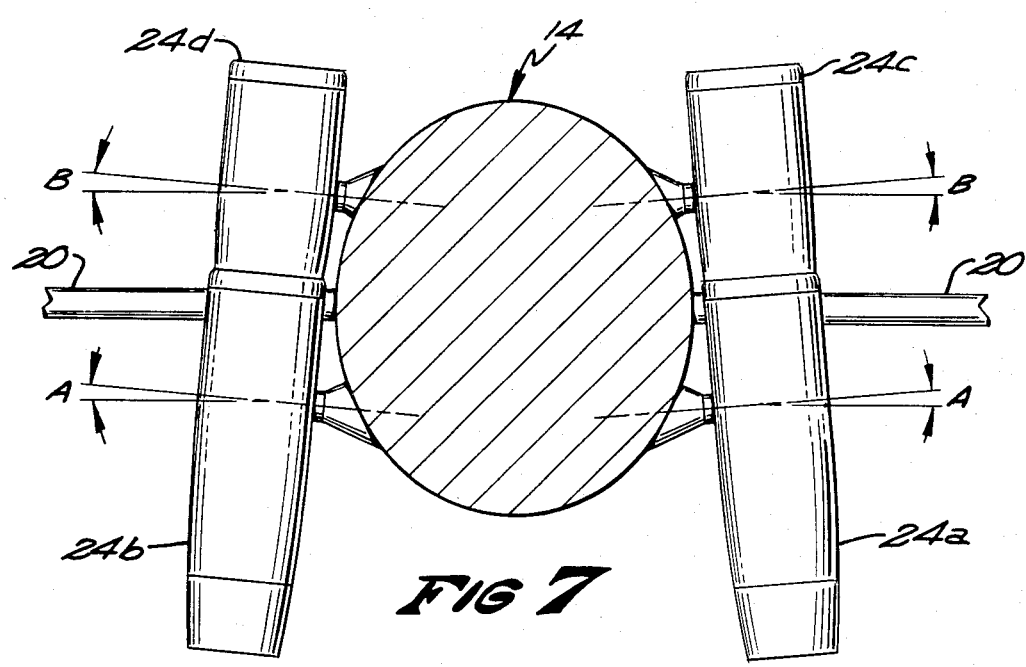
FIG. 7 shows a diagramatic, end view of the aircraft of FIG. 1 in vertical flight.

In the preferred embodiment, the first and second pivot axes of engines 24a and 24b do not lie in a horizontal plane, or generally in the plane of wings 20 but rather are at an angle A thereto as best seen in FIGS. 6 and 7. In its most preferred form, angle A is in the range of 5 to 10 degrees. Thus, the first and second pivot axes do not lie along a straight line or are parallel to each other, but rather are at an angle to each other. Likewise, in the preferred embodiment, the third and fourth pivot axes of engines 24c and 24d do not lie in a horizontal plane or generally in the plane of wings 20 but rather are at an angle B thereto as best seen in FIGS. 6 and 7. In its most preferred form, angle B is the same as angle A. Thus, the third and fourth pivot axes do not lie along a straight line or are not parallel to each other, but rather are at an angle to each other.

Aircraft 10 further includes an engine mounting and rotating system 36 according to the present invention for pivoting engines 24 generally 90 degrees between a generally vertical position and a generally horizontal position. System 36 includes in the preferred embodiment a rotating drive shaft 38 shown in its preferred form as being cylindrical in shape and having a first end 40, a second end 42, and an outside surface 44. Engine 24 may be suitably attached to end 40 of shaft 38 such as by bolts 46 with engine 24 being generally perpendicular to shaft 38. Shaft 38 may include an internal bore 48 for fuel, air, and electrical lines to engine 24.

In the preferred embodiment, shaft 38 further includes an integral ring member 50 shown in its preferred form as being cylindrical in shape having a first end 52, a second end 54, and an outside surface 56. Ring member 50 has a length less than shaft 38 such that first end 52 of ring member 50 is spaced from end 40 of shaft 38 and second end 54 of ring member 50 is spaced from end 42 of shaft 38. The outside diameter of ring member 50 is greater than the diameter of shaft 38.

Shaft 38 is rotated in the preferred embodiment by a drive gear 58 operatively secured to shaft 38. In the preferred form, gear 58 includes an inner bore of a size complementary to and for receipt on outside surface 44 and abuts with first end 52 of ring member 50. Gear 58 is then secured to shaft 38 in the preferred form by bolts 60 which extend through gear 58 and are threadably received into first end 52 of ring member 50. Gear 58 is in gearing relation and driven by worm gears 62 rotated by suitable actuators 64 mounted to fuselage 14 in the preferred embodiment of the present invention. Actuators 64 can be of a standard variety such as hydraulic or electric motors.

Shaft 38 is rotatably mounted by a bearing system 66 shown in its preferred embodiment as including a cylindrical bearing mount 68. Bearing mount 68 in its preferred form includes a ring portion 70 having an outside portion 72 suitably secured to, anchored to, or formed in fuselage 14 and an inside cylindrical surface 74. Integrally formed on surface 74 is a further ring portion 76 having an inside cylindrical surface 78 having a diameter smaller than the diameter of surface 74. Portion 76 has a length less than the length of portion 70 such that the first and second ends of portion 76 are spaced from the first and second ends of portion 70, respectively. Mount 68 further includes first and second frusto-conical portions 80 and 82 integrally formed with portions 70 and 76 and which extend angularly from surface 74 to surface 78. Portions 80 and 82 form outside bearing race surfaces.

An inside bearing race surface 84 is formed in the preferred embodiment of the present invention by a frusto-conical portion integrally formed on ring portion 50 of shaft 38. Tapered roller bearings 86 are rollably received by and between race surface 84 and race surface 80 in the preferred form of the present invention.

Bearing system 66 further includes a collar 88 removably secured to shaft 38. In the preferred embodiment, collar 88 is in the form of a ring having an inner bore of a size complementary to and for receipt of outside surface 44 and abuts with second end 54 of ring member 50. Collar 88 is then secured to shaft 38 in the preferred form by bolts 90 which extend through collar 88 and are threadably received in second end 54 of ring 50. Collar 88 includes an integral frusto-conical portion forming an integral inside bearing race surface 92 in the most preferred form of the present invention. Tapered roller bearings 94 are rollably received by and between race surfaces 82 and 92 in the preferred form of the present invention.

During assembly and assuming engine 24 is disconnected for ease of handling, and with collar 88 removed, bearing members 86 are located on shaft 38 and generally positioned on portion 84. Second end 42 is inserted into mount 68 until bearing members 86 abut with portion 80. At that time, bearing members 94 may be positioned on shaft 38 to generally abut with portion 92 and collar 88 can be positioned on outside surface 44 of shaft 38. As bolts 90 are tightened into end 54 of ring member 50, portions 84 and 80 and portions 82 and 92 are drawn together for capturing bearing members 86 and 94, respectively, therebetween. It should then be appreciated that bearing system 66 allows rotation of shaft 38 but prevents shaft 38 from moving in any other direction. Specifically, ring portion 76 and portions 80 and 82 of mount 68 are received between and captured by portions 84 and 92 as collar 88 is secured to shaft 38. Engine 24 may then be operatively attached to end 40 of shaft 38.

Figure 8:
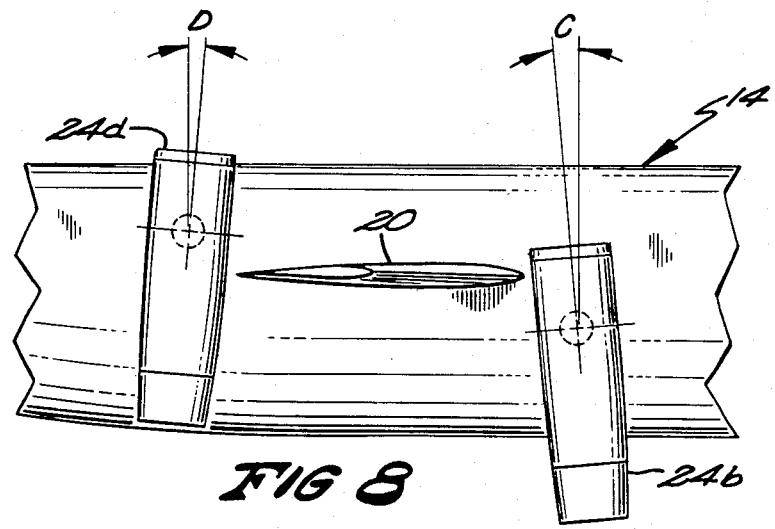
FIG. 8 shows a partial, diagramatic, side view of the aircraft of FIG. 1 in vertical flight.

In operation of aircraft 10, when it is desired to have vertical movement of aircraft 10 such as in a vertical takeoff or landing, engines 24a–d are simultaneously pivoted about their respective axes such that engines 24a and 24b are at angle C to the vertical and engines 24c and 24d are at an angle D to the vertical as best seen in FIG. 8. Thus, engines 24a and 24c and engines 24b and 24d are in an angular relation with the exhausts thereof, and thus the thrust of engines 24, being delivered generally outwardly from each other as best seen in FIG. 8. In like manner, engines 24a and 24b and engines 24c and 24d are in an angular relation to each other with the exhaust thereof, and thus the thrust of engines 24 being delivered generally outwardly from each other as best seen in FIG. 7. Thus, the thrust of engines 24 will be directed generally vertically and specifically along the corners of a pyramid having a rectangular base. Thus, a wide base of support is provided.

It should then be noted that this relationship has further advantages. For example, due to the angular relationship of engines 24a–d along angles C and D, if front 16 of aircraft 10 should dip when engines 24 are in their landing or take-off position engines 24a and 24b would be in a more vertical position than engines 24c and 24d and thus could better counteract gravity and thus have a tendency to raise front 16 of aircraft 10. Likewise, if tail 18 should dip when engines 24 are in their takeoff or landing position, engines 24c and 24d would be in a more vertical position than engines 24a and 24b and thus could better counteract gravity and thus have a tendency to raise tail 18 of aircraft 10.

In a similar manner, due to the angular relationship of engines 24a–d along angles A and B, if the port side of aircraft 10 should dip when engines 24 are in their takeoff or landing position, engines 24a and 24c would be in a more vertical position than engines 24b and 24d and thus could better counteract gravity and thus have a tendency to raise the port side of aircraft 10. Likewise, if the right side of aircraft 10 should dip when engines 24 are in their takeoff or landing positions, engines 24b and 24d would be in a more vertical position than engines 24a and 24c and thus could better counteract gravity and thus have a tendency to raise the right side of aircraft 10. Thus, aircraft 10 of the present invention obtains a dihedral-like effect which is obtained by rotating each of the engines 24 about a single pivot axis rather than by other complicated mounting systems.

When it is desired to have horizontal movement of aircraft 10, engines 24 are simultaneously pivoted about their respective axes such that engines 24 are generally horizontal or in planes generally parallel to the plane of wings 20 and are generally parallel to the longitudinal axis of aircraft 10. It can then be appreciated that it is necessary to pivot engines 24a and 24b generally 90 degrees plus angle C and to pivot engines 24c and 24d generally 90 degrees minus angle D from their takeoff and landing position to their horizontal positions. It should further be appreciated that due to angular relationships of the pivot axes along angles A and B and the right angle mounting of engines 24 to shaft 38, although engines 24a and 24b and 24c and 24d are in an angular relationship in their generally vertical position, they are parallel to each other in their generally horizontal position, with the angular relationship decreasing as engines 24a–d pivot from their generally vertical position to their generally horizontal position. Thus, the thrust of engines 24 is directed horizontally and generally parallel to the longitudinal axis of aircraft 10 for maximum engine efficiency.

When it is desired to have both horizontal and vertical movement of aircraft 10, engines 24 may be pivoted about their respective axes such that engines 24 are at an angle to the horizontal and the vertical and at an angle to the longitudinal axis of aircraft 10 or in planes which intersect the plane of wings 20 at the desired thrust angle. Thus, the thrust of engines 24 is directed at the angle of engines 24. It should then be noted that the dihedral-like effect of engines 24 due to angles A–D decreases as engines 24 are rotated from their takeoff/landing positions to their horizontal positions.

The first and second engines 24a and 24b lie in the same plane and the third and fourth engines 24c and 24d lie in the same plane in the preferred embodiment of the present invention to allow ease of flight, to insure stability, and to avoid roll over. Similarly, the thrust being delivered by each of the four engines 24a–d can generally be the same to allow ease of flight, to insure stability, and to avoid roll over, with the flight direction being controlled by rudders and flaps on wings 20 and tail 18 in a similar manner as conventional aircraft. However, flight direction may be controlled by the variable deliverance of thrust and the variable pivoting of engines 24a–d.

Now that the construction and operation of aircraft 10 according to the teachings of the present invention has been explained, many subtle features and advantages of the present invention can be set forth and appreciated. First, engines 24 are located and related on fuselage 14 according to the teachings of the present invention so as not to interfere with engine performance or to interfere with each other's performance through the full pivot arc of engines 24. Likewise, the exhaust from the first and second forward engines 24a and 24b does not enter into the intake of the third and fourth rear engines 24c and 24d of aircraft 10.

In its most preferred form, wings 20 acts as an air foil or separator when engines 24 are generally horizontal such that the exhaust of the first and second engines 24a and 24b located below wings 20 passes under wing 20 such that the exhaust fumes pass under wing 20 but not over wing 20 while the intake of the third and fourth engines 24c and 24d located above wing 20 passes over wing 20 such that intake air is taken from above wings 20 but not below wings 20.

It should be noted that gyroscopic stability is obtained for all positions of engines 24. Specifically, when engines 24 are in a horizontal position, the same gyroscopic stability is obtained as in conventional aircraft. When engines 24 are in their takeoff/landing positions, the turbines of engines 24 rotate about generally vertical axes to provide gyroscopic stability to avoid roll over, a problem encountered by prior aircraft capable of vertical and horizontal flight especially by those which do not pivot the engines but rather only direct the engine exhaust.

The number and location of engines 24 in aircraft 10 according to the teachings of the present invention also obtains advantages over prior aircraft having different number and/or location of engines. First, engines 24 are mounted to fuselage 14 of aircraft 10 rather than to wings 20 or other complicated mounting systems. Thus, the stress of engines 24 is placed directly on fuselage 14 rather than other weaker components which in turn transfers that stress to the fuselage, possibly by cantilever or lever force transfer. Thus, aircraft 10 does not require the reinforcement and strength which may be required in prior aircraft, which in turn may reduce the weight of aircraft 10. Thus, fuselage 14 and wings 20 of aircraft 10 of the present invention are more similar to conventional designs utilized in aircraft capable of only horizontal flight.

Second, a more balanced thrust is placed on aircraft 10 according to the teachings of the present invention. Thus, less stress is placed on the components of aircraft 10 thus possibly increasing aircraft life. Further, aircraft 10 allows a smoother flight and may be easier to operate and fly than prior aircraft.

Third, the use of four locations of engines 24 according to the present invention also obtains advantages. Specifically, smaller engines 24 can be utilized while maintaining the same engine thrust than if only two or fewer engines were utilized. Further, engine thrust is divided and spread out more on fuselage 14 than if only two or fewer engines were utilized. Thus, the strength requirement for the fuselage may be reduced and/or the thrust on aircraft 10 can be increased. Furthermore, since less stress is placed on the pivot locations, the stress placed on the engine mounting and rotating system is likewise reduced.

Thus, aircraft 10 according to the teachings of the present invention using four engine locations in the relationship as shown obtains several advantages over aircraft prior to the present invention.

Additionally, engine mounting and rotating system 36 according to the present invention also obtains advantages over prior engine mounting and rotating systems. Specifically, system 36 is of a simple design which is easy to manufacture and assemble, includes few components, is easy to maintain, and is relatively trouble free. Further, system 36 is able to receive and transfer thrust from the engine to fuselage and is less prone to mechanical failure or component fatigue. Thus, engine mounting and rotating system 36 according to the present invention is advantageous.

Now that the basic teachings of the present invention have been explained, many extensions and variations will be obvious to one having ordinary skill in the art. For example, although in the preferred form a single engine 24 is shown at each of the engine locations, more than one engine can be located at each of the pivot locations if desired.

Likewise, although aircraft 10 having engines 24 mounted by system 36 is advantageous and preferred, other systems for mounting and rotating engines 24 can be utilized according to the teachings of the present invention.

Similarly, the rotation members of system 36 can be varied according to the teachings of the present invention. For example, gears 58 and 62 and actuators 64 can be located on other positions on shaft 38 such as adjacent second end 42 of shaft 38.

Thus, since the invention disclosed herein may be embodied in other specific forms without departing from the spirit or the general characteristics thereof, some of which forms have been indicated, the embodiments described herein are to be considered in all respects illustrative and not restrictive. The scope of the invention is indicated by the appended claims, rather than by the foregoing description and all changes which come within the meaning and range of the equivalency of the claims are intended to be embraced therein.

What is claimed is:

1. Aircraft capable of vertical short takeoff and landing including a fuselage having a first side, a second side, and a longitudinal axis and first and second wings extending from and on opposite sides of the fuselage generally perpendicular to the longitudinal axis, comprising, in combination: first engine means for the variable delivery of thrust; means for mounting and rotating the first engine means adjacent the first side of the fuselage about a first pivot axis which is perpendicular to the longitudinal axis of the aircraft and which is in front of the center of gravity of the aircraft, with the first engine means being generally perpendicular to the first pivot axis; second engine means for the variable delivery of thrust; means for mounting and rotating the second engine means adjacent the second side of the fuselage about a second pivot axis which is perpendicular to the longitudinal axis of the aircraft and which is in front of the center of gravity of the aircraft, with the second engine means being generally perpendicular to the second pivot axis, with the first and second pivot axis lying in the same plane, and with the first pivot axis and the second pivot axis being at an angle to the horizontal; third engine means for the variable delivery of thrust; means for mounting and rotating the third engine means adjacent the first side of the fuselage about a third pivot axis which is perpendicular to the longitudinal axis of the aircraft and which is behind the center of gravity of the aircraft, with the third engine means being generally perpendicular to the third pivot axis; fourth engine means for the variable delivery of thrust; and means for mounting and rotating the fourth engine means adjacent the second side of the fuselage about a fourth pivot axis which is perpendicular to the longitudinal axis of the aircraft and which is behind the center of gravity of the aircraft, with the fourth engine means being generally perpendicular to the fourth pivot axis, with the third and fourth pivot axis lying in the same plane, and with the third pivot axis and the fourth pivot axis being at an angle to the horizontal, with the spacing of the first engine means from the longitudinal axis being equal to the spacing of the second engine means from the longitudinal axis, with the spacing of the third engine means from the longitudinal axis being equal to the spacing of the fourth engine means from the longitudinal axis, wherein the aircraft is capable of vertical flight by pivoting the first, second, third, and fourth engine means into planes generally perpendicular to the plane of the wings and with the first and second engine means and the third and fourth engine means being at angles to each other and the first and third engine means and the second and fourth engine means being at an angle to each other such that the thrust of the engine means will be directed generally vertically and outwardly from each other, where the aircraft is capable of horizontal movement by pivoting the engine means into planes generally parallel to the plane of the wings and generally parallel to each other and the longitudinal axis of the aircraft such that the thrust of the engine means is directed generally horizontally, and wherein the aircraft can include vertical and horizontal components by pivoting the engine means into a plane which intersects the plane of the wings at the desired thrust angle such that the thrust of the engine means is directed at an angle.

2. The aircraft of claim 1 wherein the first and second pivot axis are below the wings of the aircraft and wherein the third and fourth pivot axis are above the wings of the aircraft so that the first and second engines do not interfere with the performance of the third and fourth engine means of the aircraft.

3. The aircraft of claim 2 wherein the spacing of the first engine means and the second engine means from the longitudinal axis is equal to the spacing of the third engine means and the fouth engine means from the longitudinal axis to place a balanced thrust on the aircraft.

4. The aircraft of claim 1 wherein the mounting and rotating means comprises, in combination: a shaft having a first end operatively attached to the engine means; bearing means for allowing rotation of the shaft but preventing the shaft from moving in any other direction; and means for rotating the shaft, with the bearing means comprising, in combination: first frusto-conical surface formed on the shaft; second frusto-conical surface secured to the fuselage; first tapered roller bearing members rotatably received by and between the first and second frusto-conical surfaces; a collar having a third frusto-conical surface removably attached to the shaft; fourth frusto-conical surface secured to the fuselage; and second tapered roller bearing members rotatably received by and between the third and fourth frusto-conical surfaces.

5. The aircraft of claim 4 wherein the shaft rotating means comprises, in combination: a drive gear operatively attached to the shaft, and an actuator having a driver gear in gearing relation with the drive gear of the shaft.

6. Engine mounting and rotating system for use in an aircraft capable of vertical and/or horizontal flight including a fuselage comprising, in combination: a mount formed in the fuselage; a shaft having a first end and a second end, with the first end of the shaft being operatively attached to the engine; bearing means located between the shaft and the mount for allowing the rotation of the shaft but preventing the shaft from moving in any other direction; and means for rotating the shaft in the mount such that the thrust of the engine can be directed at the desired angle by rotating the shaft within the mount, with the bearing means comprising, in combination: first frusto-conical surface formed on the shaft; second, frusto-conical surface formed in the mount complementary to the first frusto-conical surface; first tapered roller bearing members rotatably received by and between the first and second frusto-conical surfaces; a collar removably attached to the shaft, with the collar including a third frusto-conical surface; fourth frusto-conical surface formed on the mount complementary to the third frusto-conical surface; and second tapered roller bearing members rotatably received by and between the third and fourth frusto-conical surfaces.

7. The engine mounting and rotating system of claim 6 wherein the shaft rotating means comprises, in combination: a drive gear operatively attached to the shaft; and at least one actuator having a driver gear in gearing relation with the drive gear of the shaft, wherein when the actuator is actuated by the operator, the driver gear gears with the drive gear and rotates the shaft within the mount.

* * * * *